US011761474B2

(12) United States Patent
Tani et al.

(10) Patent No.: US 11,761,474 B2
(45) Date of Patent: Sep. 19, 2023

(54) CONTROL CABLE CONNECTION STRUCTURE

(71) Applicant: NHK SPRING CO., LTD., Yokohama (JP)

(72) Inventors: Yoshihisa Tani, Ina (JP); Akihiko Kitazawa, Ina (JP); Katsuhiko Kitahara, Ina (JP)

(73) Assignee: NHK SPRING CO., LTD., Yokohama (JP)

(*) Notice: Subject to any disclaimer, the term of this patent is extended or adjusted under 35 U.S.C. 154(b) by 238 days.

(21) Appl. No.: 17/284,000

(22) PCT Filed: Oct. 11, 2019

(86) PCT No.: PCT/JP2019/040309
§ 371 (c)(1),
(2) Date: Apr. 9, 2021

(87) PCT Pub. No.: WO2020/075853
PCT Pub. Date: Apr. 16, 2020

(65) Prior Publication Data
US 2022/0349440 A1     Nov. 3, 2022

(30) Foreign Application Priority Data

Oct. 11, 2018  (JP) ................. 2018-192727

(51) Int. Cl.
*F16C 1/10*     (2006.01)
(52) U.S. Cl.
CPC ................... *F16C 1/101* (2013.01)

(58) Field of Classification Search
CPC .......... F16C 1/101; F16C 1/102; F16C 1/103; F16C 1/105; F16C 1/16; F16C 1/223; F16C 1/262; F16C 1/14
See application file for complete search history.

(56) References Cited

U.S. PATENT DOCUMENTS

| 2011/0100150 A1* | 5/2011 | Tarver | F16C 1/101 |
| | | | 74/502.6 |
| 2016/0290385 A1 | 10/2016 | Singleton | |

(Continued)

FOREIGN PATENT DOCUMENTS

| JP | U S62-020217 | 2/1987 | |
| JP | 2010031943 A * | 2/2010 | .............. F16C 1/101 |

(Continued)

*Primary Examiner* — Daniel D Yabut
(74) *Attorney, Agent, or Firm* — Dority & Manning, P.A.

(57) ABSTRACT

A control cable connection structure includes a long, narrow casing, a casing end, a cable end and a slider. An end portion of a first conduit is anchored at one end portion, in a length direction, of the casing. An end portion of a second conduit is anchored at the casing end. The casing end is superposed and assembled with the casing in a radial direction of the second conduit. The cable end is attached to an end portion of a second inner cord. An end portion of a first inner cord is anchored at the slider. The slider is supported at the casing to be slidable in the length direction thereof. In the assembled state, the cable end is engaged with the slider at an opposite side from a side at which the second conduit is disposed, and the second inner cord is connected with the slider.

6 Claims, 6 Drawing Sheets

(56) References Cited

U.S. PATENT DOCUMENTS

2018/0119723 A1\* 5/2018 Naoi ........................ F16C 1/101
2018/0298984 A1\* 10/2018 Tokimasa ................ F16G 11/08

FOREIGN PATENT DOCUMENTS

| JP | B 4933750 | 5/2012 | |
|----|-----------|--------|---|
| JP | 4967142 B2 \* | 7/2012 | .............. F16C 1/101 |
| WO | WO-9729290 A1 \* | 8/1997 | .............. F16C 1/101 |
| WO | WO-2015166909 A1 \* | 11/2015 | .............. F16C 1/101 |

\* cited by examiner

FIG. 10

CONTROL CABLE CONNECTION STRUCTURE

CROSS-REFERENCE TO RELATED APPLICATIONS

The present application is related and has right of priority to JP 2018-192727, which was filed on Oct. 11, 2018 in the Japanese Patent Office, and is a U.S. national phase entry of PCT/JP2019/040309, which was filed on Oct. 11, 2019, both of which are incorporated by reference in their entireties for all purposes.

TECHNICAL FIELD

The present disclosure relates to a control cable connection structure for segmenting and connecting along the length of, for example, a control cable to be used for remote operation of a car or the like.

BACKGROUND ART

Japanese Patent No. 4,933,750 discloses a control cable relay connection device for segmenting and connecting (relay connection) along the length of a long control cable. This relay connection device includes: a first control cable in which a first inner cord is inserted in a first conduit; a second control cable in which a second inner cord is inserted in a second conduit; a first coupling case to which the first conduit is fixed; a second coupling case to which the second conduit is fixed, which second coupling case is capable of tightly fitting to the first coupling case; a first coupling piece with which an end portion of the first inner cord is mated; and a second coupling piece with which an end portion of the second inner cord is mated. The first control cable includes a cylinder portion adjacent to the first coupling case. The first and second coupling pieces are slidable inside the cylinder portion.

An aperture is formed in the first coupling piece. The aperture is open to the opposite side of the first coupling piece from the side thereof at which the first inner cord is mated. A pawl is formed at an outer periphery of the second coupling piece. When the second coupling piece is fitted into the aperture in an axial direction, the first control cable and the second control cable are connected in a coaxial condition, in addition to which the pawl is mated with a protrusion portion formed at the periphery of the aperture and does not disengage therefrom. When the second coupling piece is being fitted into the aperture in the first coupling piece as described above, sliding movements of the first and second coupling pieces relative to the cylinder portion are restricted by restricting means provided at the first coupling case.

The above-mentioned restricting means includes a protrusion structured so as to project from an inner face of the cylinder portion when sliding movements of the first coupling piece are to be restricted. The cylinder portion includes an engaging indentation into which the protrusion fits when the restriction of sliding movements of the first coupling piece is to be released. When the first coupling case is being tightly fitted to the second coupling case, sliding movements of the second coupling piece are restricted by a floor face of the second coupling case abutting against the second coupling piece. When the first coupling case and second coupling case are being tightly fitted and the first coupling piece and second coupling piece are being mated, the protrusion of the restricting means abuts against an end portion of the first coupling piece at the side thereof at which the first control cable is disposed. Thus, the protrusion of the restricting means temporarily restricts sliding movements of the first and second coupling pieces. After the tight fitting of the first coupling case with the second coupling case is complete and after mating of the first coupling piece with the second coupling piece is complete, the protrusion fits into the engaging indentation. Thus, the restriction is released and the first and second coupling pieces are slidable inside the cylinder portion. Hence, the first and second inner cords, which are connected via the first and second coupling pieces, are slidable inside the first and second conduits.

SUMMARY OF INVENTION

Technical Problem

In the conventional technology described above, in order for the second coupling piece fitted into the aperture formed in the first coupling piece in the axial direction to not disengage, a resiliently deformable pawl must be formed at the first or second coupling piece. As a result, the coupling piece at which the pawl is formed has a complicated shape, which is difficult to structure as a single component. Consequently, a number of components increases and fabrication costs rise. Moreover, a protrusion portion with which this pawl mates is formed at a coupling piece. Therefore, this coupling piece has a complicated shape that is difficult to process, which also raises fabrication costs. Further, when the first control cable and the second control cable are being connected, in addition to a force for tightly fitting the second coupling case to the first coupling case, a force for fitting the second coupling piece into the first coupling piece is required. As a result, the burden of connection work may increase.

In consideration of the circumstances described above, an object of the present disclosure is to provide a control cable connection structure in which components for connecting inner cords to one another may be formed with simple shapes and that may moderate the burden of connection work.

Solution to Problem

A control cable connection structure according to a first aspect of the present disclosure includes: a first control cable include a first inner cord inserted in a first conduit; a second control cable include a second inner cord inserted in a second conduit; an elongated first case, an end portion of the first conduit being anchored at one end portion, in a length direction, of the first case; a second case at which an end portion of the second conduit is anchored, the second case being superposed and assembled with the first case in a radial direction of the second conduit, and the first and second conduits being disposed in a coaxially in an assembled state; a cable end attached to an end portion of the second inner cord; and a slider at which an end portion of the first inner cord is anchored, the slider being supported at the first case to be slidable relative to the first case in the length direction of the first case. In the assembled state, the cable end is engaged with the slider at an opposite side from a side at which the second conduit is disposed, and the second inner cord is connected with the slider.

In the control cable connection structure according to the first aspect, the first control cable include the first inner cord inserted in the first conduit, the end portion of the first conduit is anchored at one end portion, in the length direction, of the first case, and the end portion of the first inner cord is anchored at the slider. Of the second control cable include the second inner cord inserted in the second conduit, the end portion of the second conduit is anchored at the second case, and the cable end is attached to the end portion of the second inner cord. The second case is superposed with the first case in the radial direction of the second conduit and assembled to the first case. Thus, the first conduit and the second conduit are connected via the first case and the second case and are disposed in a coaxial condition. The slider is supported at the first case to be slidable in the length direction of the first case. In the state in which the second case is assembled to the first case, the cable end is mated with the slider from the opposite side thereof from the side at which the second conduit is disposed, and the second inner cord is connected with the slider. Therefore, the first inner cord and second inner cord are connected via the slider and the cable end.

It is sufficient for the cable end to be, for example, a simple nipple end. It is sufficient for the slider to be a part at which the first inner cord can be anchored and with which the cable end can be mated from the opposite side of the cable end from the side thereof at which the second conduit is disposed. Therefore, the slider and the cable end (that is, the components for connecting the inner cords with one another) may be formed in simple shapes. Moreover, because the cable end is mated with the slider from the opposite side thereof from the side at which the second conduit is disposed and the cable end is a structure that connects the second inner cord with the slider, there is no requirement for a force to be applied when the second inner cord is being connected to the slider. Therefore, when the conduits and the inner cords are being connected, it is sufficient to apply a force for assembling the second case to the first case. Thus, the burden of connection work may be moderated.

In a control cable connection structure according to a second aspect of the present disclosure, in the control cable connection structure according to the first aspect, the second case includes two side walls and, during the assembly, the first case is fitted in at inner sides of the two side walls such that engaging portions formed at respective side faces of the first case engage with engagement portions formed at the two side walls of the second case.

According to the control cable connection structure according to the second aspect, when the second case is being assembled to the first case, the first case is fitted into the inner side of the two side walls of the second case. Thus, the engaging portions (for example, bump portions) formed at the two side walls of the first case are engaged with the engagement portions (for example, apertures) formed at the two side walls of the second case. Therefore, the state in which the second case is assembled to the first case may be maintained with a simple structure.

In a control cable connection structure according to a third aspect of the present disclosure, in the control cable connection structure according to the first aspect or the second aspect, an elongated hole is formed in the slider, the elongated hole being long in a sliding direction of the slider, the cable end is to be inserted into the elongated hole during assembly, and the elongated hole is configured with a larger dimension in the sliding direction than the cable end.

According to the control cable connection structure according to the third aspect, when the second case is being assembled to the first case, the cable end attached to the end portion of the second inner cord is inserted into (accommodated in) the elongated hole formed in the slider. The elongated hole is longest in the sliding direction of the slider, being configured with a larger dimension in the sliding direction than the cable end. Therefore, when the cable end is being inserted into the elongated hole of the slider, even if there is inconsistency of positions in the sliding direction of the cable end and the slider, the cable end is inserted into the elongated hole of the slider easily.

In a control cable connection structure according to a fourth aspect of the present disclosure, in the control cable connection structure according to the third aspect, an insertion guide portion is formed at the second case, another end portion of the second inner cord being inserted into the insertion guide portion and, during the assembly, insertion of the cable end into the elongated hole is guided by the insertion guide portion.

According to the control cable connection structure according to the fourth aspect, the insertion guide portion into which the end portion of the second inner cord is inserted is formed at the second case. When the second case is being assembled to the first case, the insertion of the cable end attached to the end portion of the second inner cord into the elongated hole of the slider is guided by the insertion guide portion. Therefore, the cable end is inserted into the elongated hole of the slider even more easily.

In a control cable connection structure according to a fifth aspect of the present disclosure, in the control cable connection structure according to any one of the first to fourth aspects, an assembly guide portion is formed at the second case, the assembly guide portion being open to an opposite side of the second case from the side thereof at which the second conduit is disposed and, during the assembly, another end portion, in a length direction, of the first case is inserted into the assembly guide portion and, in an inserted state, the second case is turned in the radial direction relative to the first case.

According to the control cable connection structure according to the fifth aspect, when the second case is being assembled to the first case, firstly, another end portion, in the length direction, of the first case is inserted into the assembly guide portion formed at the second case. As a result, misalignment of the second case relative to the first case is restricted. Then, in the state in which misalignment is restricted (the inserted state described above), the second case is turned relative to the first case in the radial direction of the second conduit. Thus, the second case is superposed with the first case in the radial direction of the second conduit and assembled to the first case. According to this structure, assembly is easier than in a structure in which the second case is superposed with and assembled to the first case linearly in the radial direction of the second conduit.

In a control cable connection structure according to a sixth aspect of the present disclosure, in the control cable connection structure according to the fifth aspect, a protrusion is formed at one of the first case or the second case, an indentation is formed at the other of the first case or the second case and, in the inserted state, the protrusion engages with the indentation and a region of engagement configures a center of the turning.

According to the control cable connection structure according to the sixth aspect, in the state in which the length direction other end portion of the first case is inserted into the assembly guide portion formed at the second case, the protrusion formed at the one of the first or second cases engages with the indentation formed at the other of the first or second cases. The region of engagement configures the center of rotation when the second case is being turned relative to the first case in the radial direction of the second conduit. Therefore, shifting of the center of rotation when the second case is being turned relative to the first case may be prevented.

In a control cable connection structure according to a seventh aspect of the present disclosure, the control cable connection structure according to any one of the first to sixth aspects further includes a stopper attached to the first case, the stopper being displaceable between a restriction position and a release position, the stopper at the restriction position restricting sliding of the slider, and the stopper at the release position releasing the restriction.

According to the control cable connection structure according to the seventh aspect, when the second case is being assembled to the first case, the stopper is disposed at the restriction position. Thus, sliding of the slider relative to the first case may be restricted. Therefore, the end portion of the second inner cord may be inserted into the insertion slot easily. After the assembly of the second case to the first case is complete, when the stopper is displaced from the restriction position to the release position, the restriction of sliding is released. Hence, the first and second inner cords that are connected via the slider are slidable.

In a control cable connection structure according to an eighth aspect of the present disclosure, in the control cable connection structure according to the seventh aspect, a mating portion is provided at the stopper and, if the second case is disposed at an incomplete assembly position relative to the first case when the stopper is displaced from the restriction position toward the release position, the mating portion is configured to mate with the second case and displace the second case relative to the first case to a completed assembly position.

According to the control cable connection structure according to the eighth aspect, even if an assembly failure occurs during the work of assembly of the second case to the first case and the second case is disposed at a position of incomplete assembly to the first case, the stopper is displaced from the restriction position to the release position after the assembly work. Therefore, the mating portion provided at the stopper mates with the second case and displaces the second case relative to the first case to the completed assembly position. In this way, the assembly failure may be resolved.

Advantageous Effects of Invention

As described above, according to the control cable connection structure according to the present disclosure, components for connecting inner cords to one another may be formed with simple shapes and the burden of connection work may be moderated.

DETAILED DESCRIPTION

Below, a control cable connection structure 10 (which may be referred to simply as "the connection structure 10" below) according to an exemplary embodiment of the present disclosure is described using FIG. 1 to FIG. 10. In the drawings, some reference symbols may be omitted with a view to simplification of the drawings. For the sake of convenience, arrows FR, RH and UP that are shown where appropriate in the drawings represent, respectively, forward, rightward and upward of the connection structure 10. A front-and-rear direction, left-and-right direction and vertical direction of the connection structure 10 match, respectively, a length direction, width direction and thickness direction of the connection structure 10. Where descriptions are given simply using the directions front, rear, left, right, upper and lower, these represent directions relative to the connection structure 10. Note that the directions front, rear, left, right, upper and lower mentioned above have no relation to directions in a state of use of the connection structure 10.

—Structure—

As shown in FIG. 1 to FIG. 4, the control cable connection structure 10 according to the present exemplary embodiment includes a first control cable 12, a second control cable 18, a casing 24 that serves as a first case, a casing end 54 that serves as a second case, a cover 86, a slider 90, a cable end 84 and a stopper 106. The connection structure 10 is a structure for segmenting and connecting (relay connection) along the length of a long control cable that is used in, for example, remote operation of a car or the like. This remote operation may be, for example, an operation for opening a trunk lid or a fuel cap from a driver seat, or an operation for lowering a seat back of a rear seat from a rear hatch side. The present exemplary embodiment may be understood as being an exemplary embodiment of a control cable equipped with the structural elements mentioned above.

In this exemplary embodiment, the first control cable 12 is a cable connected to a remote side (for example, the vicinity of a rear hatch). The first control cable 12 is structured by a first conduit (outer cable) 14 and a first inner cord (inner cable) 16 that is inserted in the first conduit 14. A circular tube-shaped metal cap 14A is attached to one end portion of the first conduit 14 (an end portion at the opposite side of the first conduit 14 from the remote side thereof) by means such as crimping or the like. In this exemplary embodiment, the second control cable 18 is a cable connected to an operation object side (for example, a rear seat). The second control cable 18 is structured by a second conduit (outer cable) 20 and a second inner cord (inner cable) 22 that is inserted in the second conduit 20.

The casing 24 is formed of, for example, a resin. The casing 24 is formed in a long, narrow shape that is longest in the front-and-rear direction of the connection structure 10. The casing 24 includes a front wall 26, a rear wall 28, a left wall 30, a right wall 32 and a bottom wall 34. Thus, the casing 24 is formed in a box shape that is open to the upper side. The casing 24 includes a dividing wall 36 that is disposed a little to the front side relative to the rear wall 28. The dividing wall 36 is formed integrally with the left wall 30, the right wall 32 and the bottom wall 34. The dividing wall 36 opposes the rear wall 28 from the front side thereof with a gap therebetween.

The front wall 26 is formed such that thickness in the front-and-rear direction increases to the front side toward the upper side. The front wall 26 is also formed such that a left-and-right direction dimension decreases towards the front side. Thus, a left and right pair of taper faces 26A are formed at both left and right side faces of the front wall 26. The taper faces 26A are angled so as to approach one another toward the front side. An insertion slot 38 that is open to the upper side is formed in a left-and-right direction central portion of the front wall 26. The insertion slot 38 penetrates through the front wall 26 in the front-and-rear direction. A pair of left and right protrusions 40 are formed at an upper end portion of the front wall 26, at both the left and right sides of the insertion slot 38. The protrusions 40 project to the front side.

An engaging slot 42 that is open to the upper side is formed in a left-and-right direction central portion of the rear wall 28. An insertion slot 44 that is open to the upper side is formed in a left-and-right direction central portion of the dividing wall 36. The engaging slot 42 penetrates through the rear wall 28 in the front-and-rear direction, and the insertion slot 44 penetrates through the dividing wall 36 in the front-and-rear direction. The metal cap 14A of the first conduit 14 is engaged in the gap between the rear wall 28 and the dividing wall 36. An adjacent portion of the first conduit 14 that is adjacent to the metal cap 14A (a region with a smaller diameter than the metal cap 14A) is engaged in the engaging slot 42. Thus, the one end portion of the first conduit 14 is anchored at a length direction one end portion (a rear end portion) of the casing 24. The first inner cord 16 is inserted in the insertion slot 44. In this state, the one end side of the first inner cord 16 is inserted (accommodated) in the casing 24.

Front and rear pairs of protrusions 46 are respectively formed at length direction middle portions of the left wall 30 and the right wall 32. The protrusions 46 project to the outer sides in the left-and-right direction and extend in the vertical direction. The protrusions 46 extend to the lower side beyond the bottom wall 34. Penetrating apertures 48 are respectively formed in the left wall 30 and the right wall 32. The penetrating apertures 48 penetrate through the left wall 30 and right wall 32 between the front and rear pairs of protrusions 46. The penetrating apertures 48 are formed in rectangular shapes as viewed in the left-and-right direction. Engaging bump portions 50 are formed at the front side relative to the front and rear pairs of protrusions 46. The engaging bump portions 50 project to the outer sides in the left-and-right direction and extend in the front-and-rear direction. The engaging bump portions 50 are equivalent to "engaging portions" of the present disclosure and are formed at the two left and right side faces of the casing 24. The engaging bump portions 50 correspond with the casing end 54. Respective pairs of front and rear engaging bump portions 52 are formed at the left wall 30 and the right wall 32. The engaging bump portions 52 are formed at the rear side relative to the front and rear pairs of protrusions 46. The engaging bump portions 52 project to the outer sides in the left-and-right direction and extend in the front-and-rear direction. The engaging bump portions 52 correspond with the cover 86.

The casing end 54 is formed of, for example, a resin. The casing end 54 is formed in a long, narrow shape that is longest in the front-and-rear direction of the connection structure 10. However, a length direction dimension of the casing end 54 is specified to be significantly smaller than the length direction dimension of the casing 24. The casing end 54 includes a top wall 56, a front wall 58, a left wall 60 and a right wall 62. Thus, the casing end 54 is formed in a box shape that is open to the rear side and the lower side. A projecting portion 56A is provided at a rear end portion of the top wall 56. The projecting portion 56A protrudes further to the rear side than the left wall 60 and the right wall 62.

A conduit anchoring portion 64 that projects to the front side is formed at a left-and-right direction central portion of the front wall 58. The conduit anchoring portion 64 is formed in a circular tube shape with an axial direction in the length direction of the casing end 54. The conduit anchoring portion 64 is open to the front side (see FIG. 5 to FIG. 9). One end portion of the second conduit 20 (an end portion at the opposite side of the second conduit 20 from the side thereof at which the operation object is disposed) is engaged in the conduit anchoring portion 64 (the second conduit 20 is not shown in FIG. 5 to FIG. 9). The one end portion of the second conduit 20 is crimped to and anchored at the conduit anchoring portion 64 by, for example, a ring-shaped crimping fixture that is not shown in the drawings.

An insertion guide portion 68 that protrudes toward the rear side is formed at a left-and-right direction central portion of the front wall 58. The insertion guide portion 68 forms a substantially circular tube shape with an axial direction in the length direction of the casing end 54. The insertion guide portion 68 can be inserted into the insertion slot 38 from the upper side thereof. An inner cord insertion hole 70 is formed in the insertion guide portion 68, penetrating through the insertion guide portion 68 in the front-and-rear direction. The inner cord insertion hole 70 is formed in a coaxial condition with the conduit anchoring portion 64, and the inner cord insertion hole 70 is in fluid communication with the conduit anchoring portion 64. The one end side of the second inner cord 22 is inserted in the inner cord insertion hole 70. Thus, the one end side of the second inner cord 22 is retained at the insertion guide portion 68. The cable end 84, with a cylindrical shape, is coaxially fixed (attached) to the one end portion of the second inner cord 22. The cable end 84 is a nipple end, which is formed with a larger diameter than the second inner cord 22. The cable end 84 is disposed inside the casing end 54 (between the left wall 60 and the right wall 62). The cable end 84 is not required to be fixed to the second inner cord 22; the cable end 84 may be attached to the second inner cord 22 to be slidable toward the other end side of the second inner cord 22. An indentation 72, which is indented toward the front side, is formed in the rear face of an upper end portion of the front wall 58 (see FIG. 5 to FIG. 8). The indentation 72 corresponds with the aforementioned left and right pair of protrusions 40.

The left wall 60 and the right wall 62 constitute left and right side walls of the casing end 54. Engaging apertures 74 are respectively formed in front-and-rear direction middle portions of the left wall 60 and right wall 62. The engaging apertures 74 penetrate through the left wall 60 and right wall 62 and extend in the front-and-rear direction. The engaging apertures 74 are equivalent to "engagement portions" of the present disclosure, and correspond with the aforementioned engaging bump portions 50.

An assembly guide portion 76 is formed at a front portion of the casing end 54. The assembly guide portion 76 is open to the rear side (the opposite side from the side thereof at which the second conduit 20 is disposed). The assembly guide portion 76 is structured by a left wall 78 and right wall 80, which extend to the lower side from front portions of the left wall 60 and right wall 62, and a lower wall 82, which connects between lower end portions of the left wall 78 and right wall 80 in the left-and-right direction. The left wall 78 and the right wall 80 are formed in substantially triangular shapes as viewed in the left-and-right direction, being formed such that vertical direction dimensions thereof to the lower side increase toward the rear side. The lower wall 82 is angled so as to approach the upper side toward the front side. A front end portion of the lower wall 82 is integrally connected to a lower end portion of the front wall 58.

Figure 1:
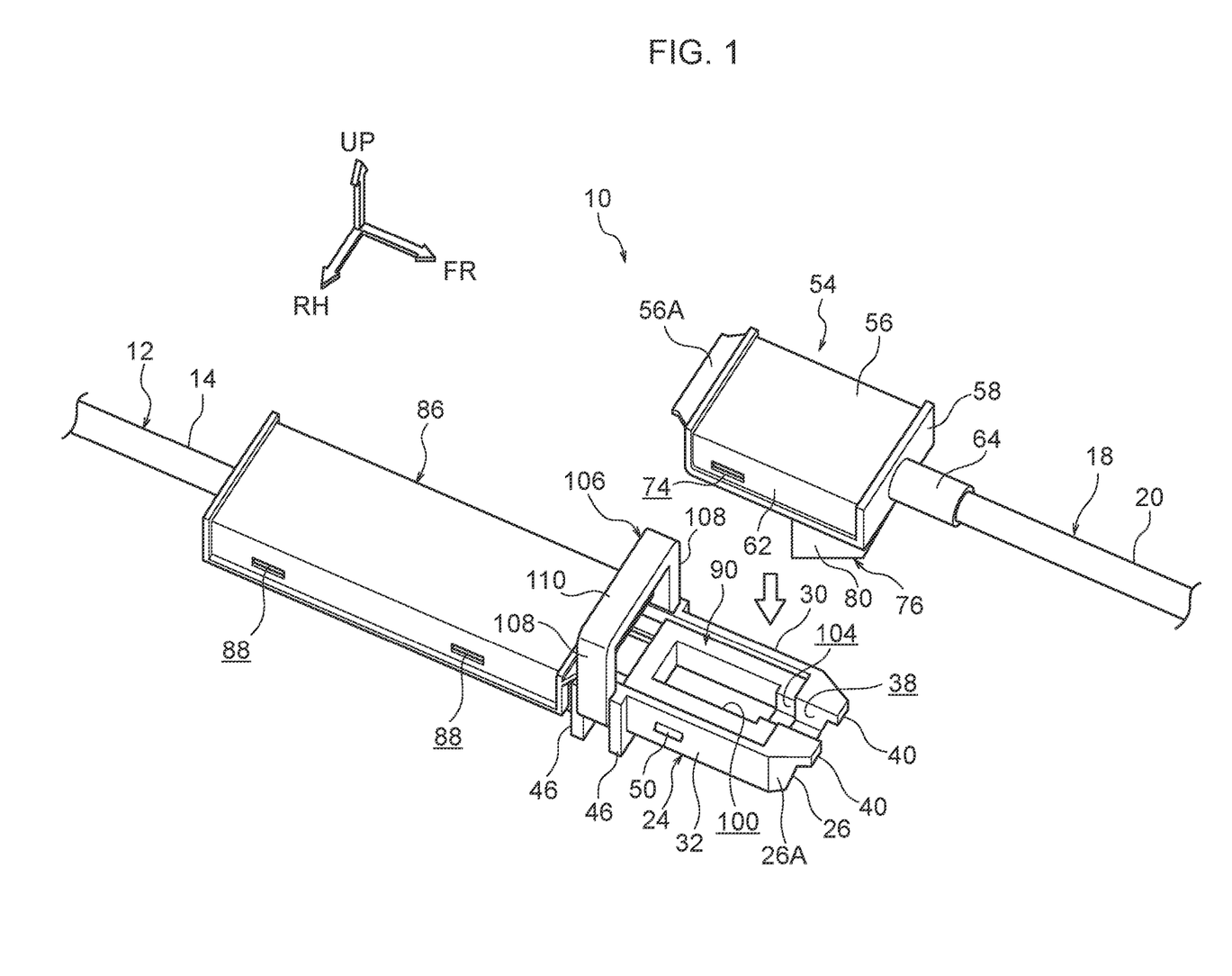
FIG. 1 is a perspective view of a control cable connection structure according to an exemplary embodiment of the present disclosure, showing a state before a casing end serving as a second case is assembled to a casing serving as a first case.

The casing end 54 with the structure described above is structured to be superposed with and assembled to a front portion of the casing 24 (a region at the front side relative to the front and rear pairs of protrusions 46) from the upper side thereof (see the hollow arrow shown in FIG. 1). In the state in which the casing end 54 has been assembled to the casing 24 (which may be referred to simply as "the assembled state" below), the first conduit 14 and the second conduit 20 are disposed in a coaxial condition, and the first conduit 14 and second conduit 20 are disposed at mutually opposite sides with the casing 24 therebetween. In the assembled state, the engaging bump portions 50 are engaged in the engaging apertures 74. Thus, the assembled state is maintained.

Figure 2:
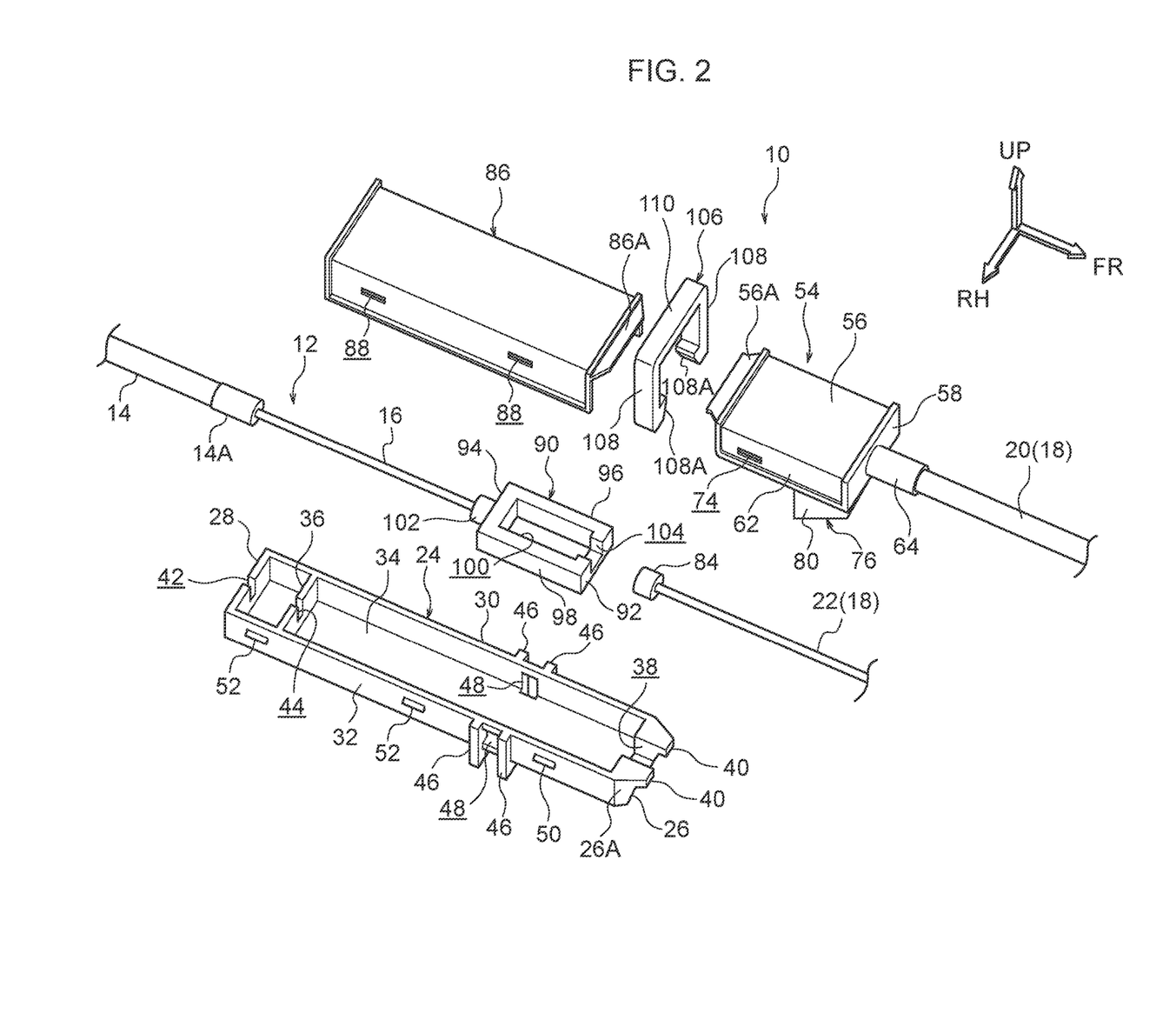
FIG. 2 is a an exploded perspective view showing the control cable connection structure according to the exemplary embodiment of the present disclosure.
Figure 3:
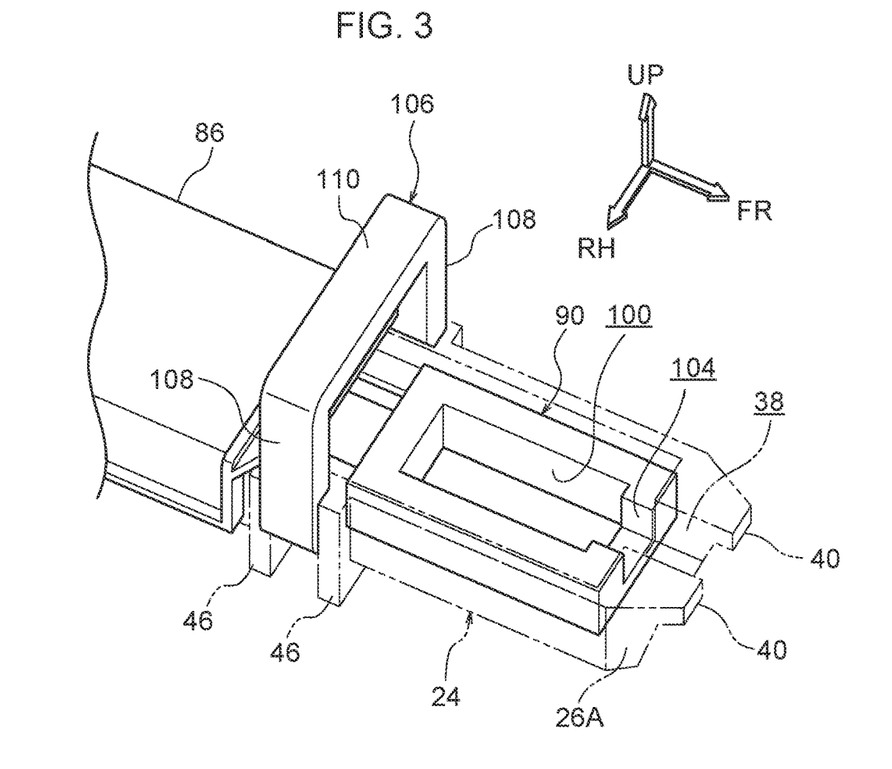
FIG. 3 is a perspective view showing a portion of FIG. 1 in a magnified state in which the casing is transparent.
Figure 4:
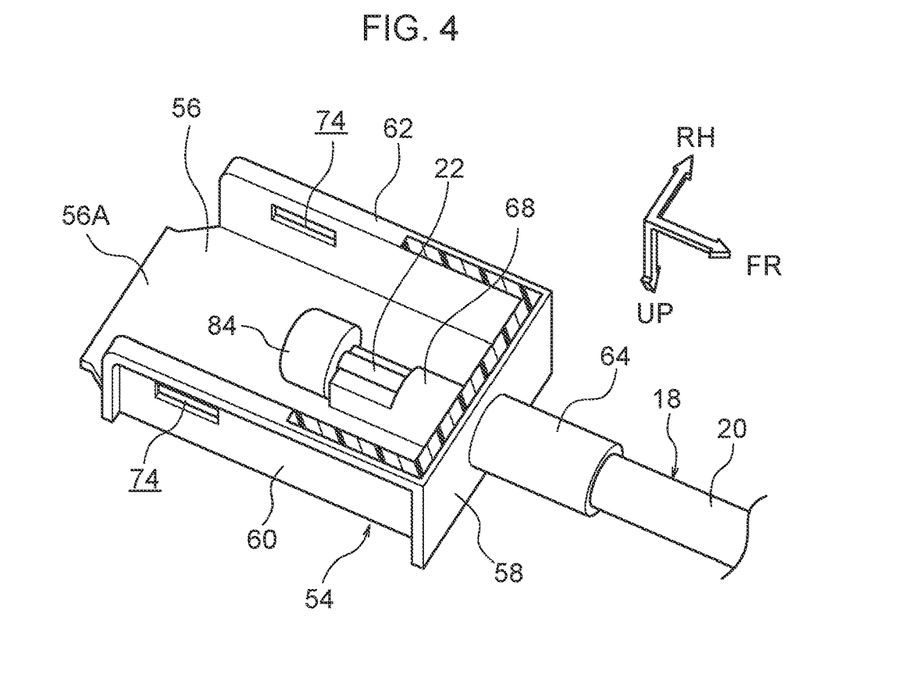
FIG. 4 is a perspective view in which peripheral structures including the casing end are seen from a rear side of the casing end, which is a view showing a state in which a portion of the casing end is cut away.
Figure 5:
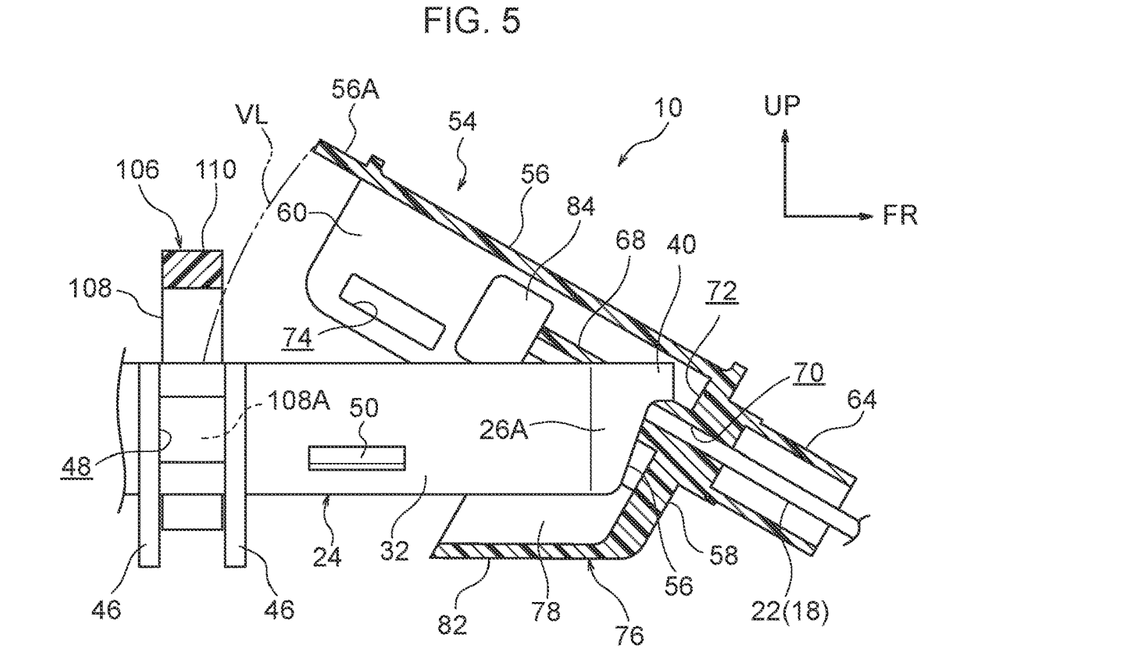
FIG. 5 is a partial sectional diagram showing a state partway through assembly of the casing end to the casing.
Figure 6:
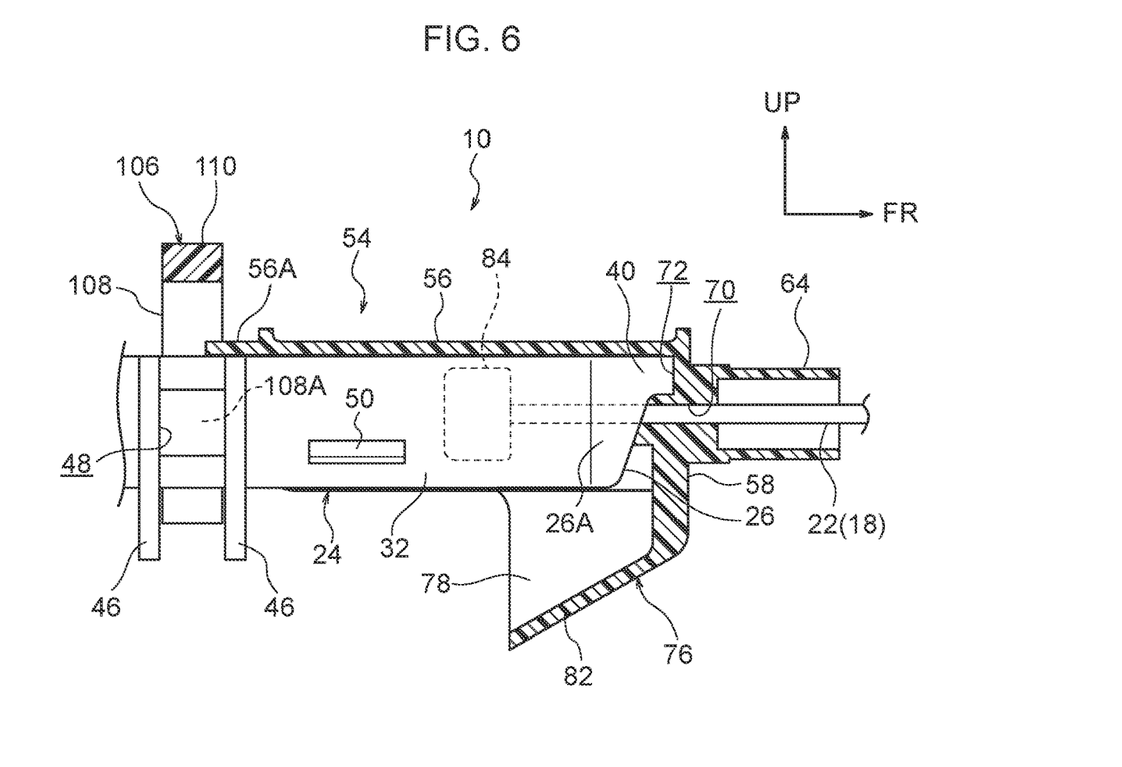
FIG. 6 is a partial sectional diagram showing a state of completion of the assembly of the casing end to the casing.

The cover 86, which is shown in FIG. 1 to FIG. 3, is formed of, for example, a resin. The cover 86 is formed in a long, narrow shape that is longest in the front-and-rear direction of the connection structure 10. The cover 86 includes a top wall and left and right side walls. Thus, the cover 86 is formed in a box shape that is open to the lower side and to both sides in the front-and-rear direction (a trough shape). A projecting portion 86A is provided at the top wall of the cover 86. The projecting portion 86A projects further to the front side than the left and right side walls of the cover 86. Front and rear pairs of engaging apertures 88 are respectively formed in the left and right side walls of the cover 86. The engaging apertures 88 penetrate through the side walls in the left-and-right direction and extend in the front-and-rear direction. The engaging apertures 88 correspond with the aforementioned engaging bump portions 52. The cover 86 is structured to be superposed with and assembled to a rear portion of the casing 24 (a region at the rear side relative to the front and rear pairs of protrusions 46). In the state in which the cover 86 has been assembled to the casing 24, the engaging bump portions 52 engage in the engaging apertures 88. Thus, the assembled state of the cover 86 to the casing 24 is maintained.

The slider 90, which is shown in FIG. 1 to FIG. 3, is formed of, for example, a metal. The slider 90 is formed as a frame with a long, narrow shape that is longest in the front-and-rear direction of the connection structure 10. More specifically, as shown in FIG. 2, the slider 90 is structured by a front wall portion 92, a rear wall portion 94, a left wall portion 96, and a right wall portion 98. The front wall portion 92 and rear wall portion 94 oppose one another in the front-and-rear direction and extend in the left-and-right direction. The left wall portion 96 connects between left end portions of the front wall portion 92 and rear wall portion 94 in the front-and-rear direction. The right wall portion 98 connects between right end portions of the front wall portion 92 and rear wall portion 94 in the front-and-rear direction.

A length direction dimension of the slider 90 is specified to be significantly smaller than the length direction dimension of the casing 24. More specifically, the length direction dimension of the slider 90 is specified to be equal to a distance from front edge portions of the penetrating apertures 48 formed in the left wall 30 and right wall 32 of the casing 24 to the rear face of the front wall 26. The slider 90 is accommodated between the front wall 26 of the casing 24 and the dividing wall 36 (in other words, inside the casing 24). The slider 90 is supported at the casing 24 to be slidable in the length direction of the casing 24. A elongated hole 100 is formed in a central portion of the slider 90. The elongated hole 100 is formed in a long, narrow, rectangular shape that is longest in the sliding direction of the slider 90. The elongated hole 100 penetrates through the slider 90 in the vertical direction. The elongated hole 100 is specified with a front-and-rear direction dimension (in the sliding direction of the slider 90) that is significantly larger than the front-and-rear direction dimension of the cable end 84.

An inner cord anchoring portion 102 is formed at a left-and-right direction central portion of the rear wall portion 94 of the slider 90. The inner cord anchoring portion 102 projects to the rear side in a circular rod shape. The one end portion of the first inner cord 16 is anchored (fixed) at the inner cord anchoring portion 102. The one end portion of the first inner cord 16 is fixed to the slider 90 by integral molding when, for example, the slider 90 is molded by die-casting. An insertion slot 104 that is open to the upper side is formed in a left-and-right direction central portion of the front wall portion 92 of the slider 90. The insertion slot 104 penetrates through the front wall portion 92 in the front-and-rear direction. In a state in which the slider 90 is disposed at a front portion of the interior of the casing 24 (a state in which the front face of the slider 90 opposes the front wall 26 of the casing 24 and abuts against or is in close proximity with the front wall 26; the same hereinafter), the insertion slot 104 is disposed to be continuous with the insertion slot 38 of the casing 24. The aforementioned insertion guide portion 68 can be inserted from the upper side into the insertion slot 38 and into the insertion slot 104. Slot widths (left-and-right direction dimensions) of the insertion slot 38 and the insertion slot 104 are specified to be slightly larger than a left-and-right direction dimension of the insertion guide portion 68. Thus, an insertion force for inserting the insertion guide portion 68 into the insertion slot 38 and insertion slot 104 is specified to be zero or very small.

The stopper 106, which is shown in FIG. 1 to FIG. 3 and FIG. 5 to FIG. 8, is formed of, for example, a resin. As viewed in the front-and-rear direction, the stopper 106 is substantially formed in an inverted "U" shape that is open to the lower side. More specifically, the stopper 106 is structured by a left and right pair of leg portions 108 and a connecting portion 110. The leg portions 108 oppose one another in the left-and-right direction and extend in the vertical direction. The connecting portion 110 connects between upper end portions of the left and right pair of leg portions 108 in the left-and-right direction. The connecting portion 110 is equivalent to a "mating portion" of the present disclosure. The left and right pair of leg portions 108 are inserted between the pairs of front and rear protrusions 46 formed at the left wall 30 and right wall 32 of the casing 24. Thus, the stopper 106 is slidable (displaceable) in the vertical direction relative to the casing 24.

Protruding portions 108A that project to sides approaching one another are respectively formed at lower end portions of the left and right pair of leg portions 108. In a state in which the stopper 106 is disposed at a restriction position, which is shown in FIG. 1, FIG. 3, FIG. 5 and FIG. 6, the protruding portions 108A engage in the penetrating apertures 48 formed in the casing 24. In this state, the stopper 106 is retained at the restriction position and distal end sides of the protruding portions 108A project inside the casing 24. In the state in which the slider 90 is disposed in the front portion of the interior of the casing 24, the protruding portions 108A oppose the rear face of the slider 90 from the rear side thereof, abutting against or in close proximity with the rear face of the slider 90. Therefore, when the stopper 106 is disposed at the restriction position in the state in which the slider 90 is disposed in the front portion of the interior of the casing 24, the stopper 106 restricts sliding of the slider 90 relative to the casing 24. Further, in the state in which the stopper 106 is disposed at the restriction position, the connecting portion 110 of the stopper 106 is disposed to be separated to the upper side from the casing 24. The restriction of sliding described above encompasses both a situation in which sliding of the slider 90 relative to the casing 24 is restricted to a certain range and a situation in which sliding of the slider 90 relative to the casing 24 is disabled.

Figure 7:
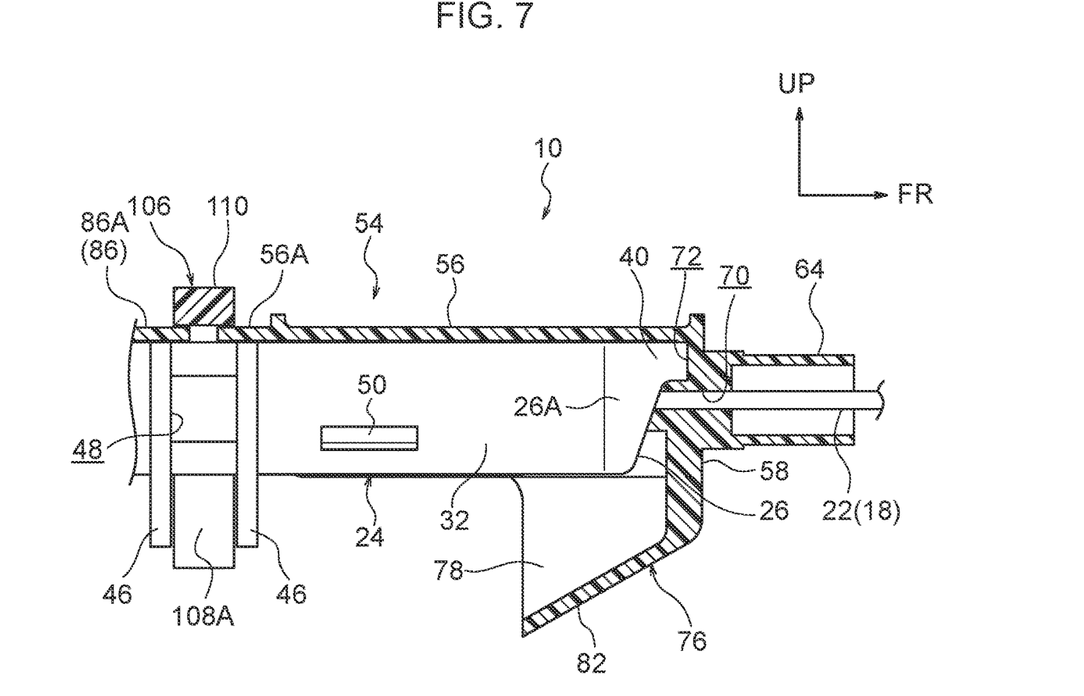
FIG. 7 is a partial sectional diagram showing a state, after completion of the assembly of the casing end to the casing, in which a stopper has been displaced from a restriction position to a release position.
Figure 8:
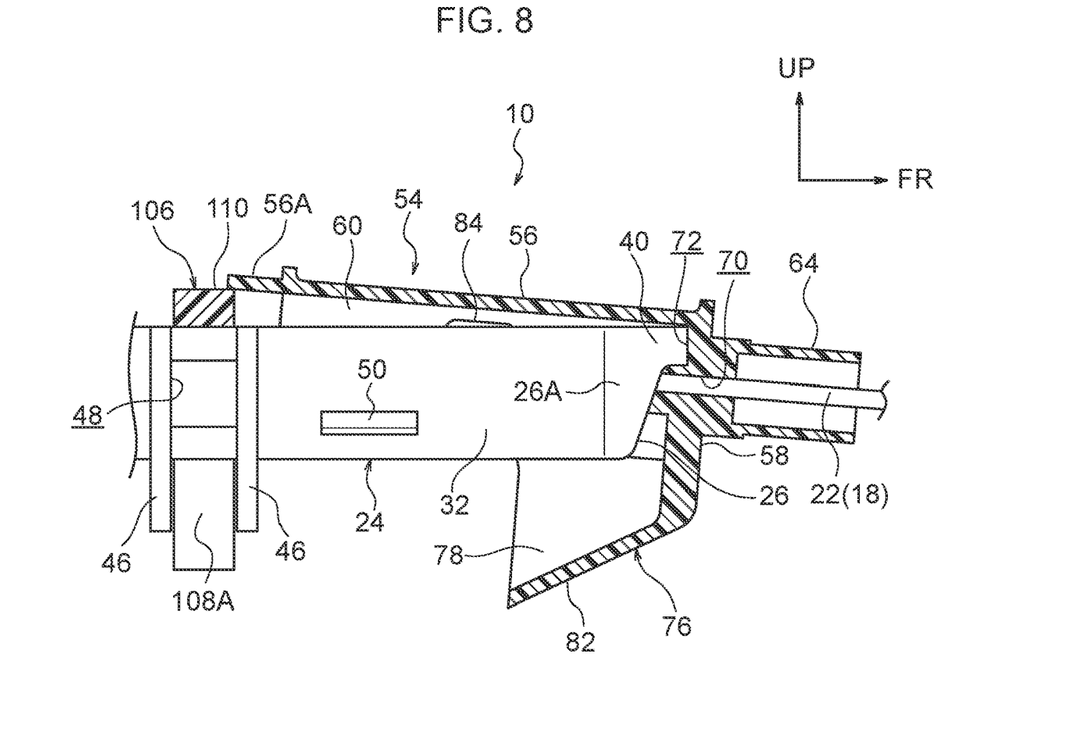
FIG. 8 is a partial sectional diagram showing a state in which the stopper is disposed at the release position at a time of assembly of the casing end to the casing.

In a state in which the stopper 106 is disposed at a release position, which is shown in FIG. 7 and FIG. 8, upper faces of the protruding portions 108A hook onto two left and right end portions of the lower face of the casing 24. In this state, the protruding portions 108A do not project inside the casing 24. Thus, the above-described restriction of sliding of the slider 90 by the stopper 106 is released. In the state in which the stopper 106 is disposed at the release position, the connecting portion 110 is closer to the casing 24 than in the state in which the stopper 106 is disposed at the restriction position. In the state in which the stopper 106 is disposed at the release position, distances between upper faces of the left wall 30 and right wall 32 and the lower face of the connecting portion 110 are equal to thickness dimensions of the aforementioned projecting portions 56A and 86A.

—Connection Method—

Now, for the connection structure 10 with the structure described above, a connection method of the first control cable 12 with the second control cable 18 is described. Before the first control cable 12 and second control cable 18 of the connection structure 10 are connected, in the state in which the slider 90 is disposed in the front portion of the interior of the casing 24, the stopper 106 is disposed at the restriction position and the cover 86 (not shown in FIG. 5 and FIG. 6) is assembled to the casing 24. In this state, the casing end 54 is superposed with and assembled to the casing 24 in the radial direction of the second conduit 20. During this assembly, firstly, the length direction other end portion of the casing 24 (the end portion at the side of the casing 24 at which the front wall 26 is disposed) is inserted into the assembly guide portion 76 of the casing end 54, and the protrusions 40 formed at the casing 24 are engaged with the indentation 72 formed in the casing end 54 (see FIG. 5).

Figure 9:
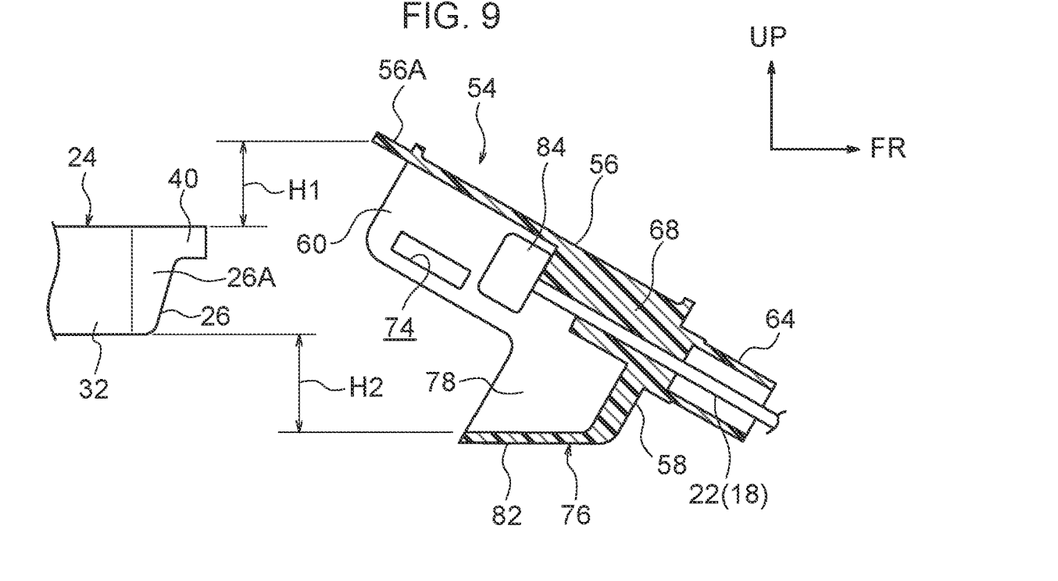
FIG. 9 is a partial sectional diagram for describing a structure capable of taking up misalignment of the casing and the casing end in a vertical direction during the assembly of the casing end to the casing.
Figure 10:
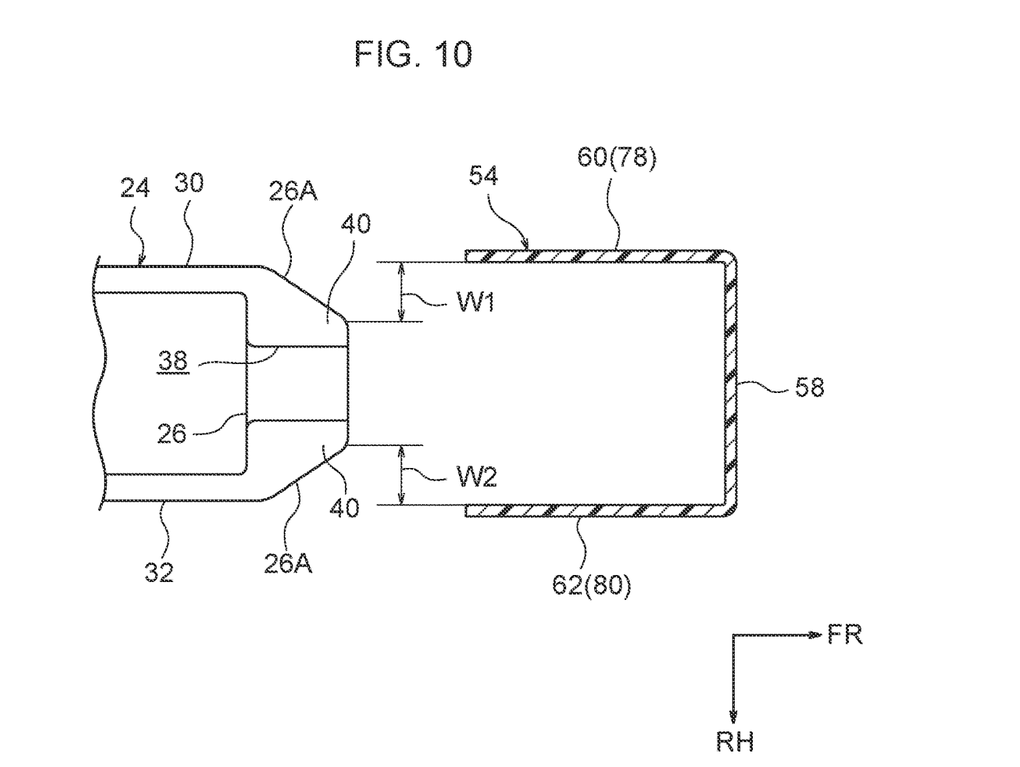
FIG. 10 is a partial sectional diagram for describing a structure capable of taking up misalignment of the casing and the casing end in a left-and-right direction during the assembly of the casing end to the casing.

During the insertion of the casing 24 into the assembly guide portion 76, as shown in FIG. 9, misalignment of the casing 24 and the casing end 54 in the vertical direction may be taken up by the top wall 56 of the casing end 54 and the lower wall 82 of the assembly guide portion 76 (see arrow H1 and arrow H2 in FIG. 9). Also during this insertion, as shown in FIG. 10, misalignment of the casing 24 and the casing end 54 in the left-and-right direction may be taken up by the left and right pair of taper faces 26A formed at the casing 24 (see arrow W1 and arrow W2 in FIG. 10).

In the state after this insertion, the casing end 54 is turned in the radial direction of the second conduit 20 relative to the casing 24. Thus, the casing end 54 is superposed with the casing 24 in the radial direction of the second conduit 20 and is assembled to the casing 24 (see FIG. 6). During this assembly, the one end portion of the second inner cord 22 is inserted into the insertion slot 104 of the slider 90, and the cable end 84 attached to the one end portion of the second inner cord 22 is inserted into the elongated hole 100 of the slider 90. The cable end 84 is mated with (hooked onto) edge portions of the insertion slot 104 of the slider 90 (the front wall portion 92) at the opposite side of the slider 90 from the side thereof at which the second conduit 20 is disposed. Thus, the second inner cord 22 is connected with the slider 90. In this assembled state, the engaging bump portions 50 engage in the engaging apertures 74. Therefore, this assembled state is maintained.

During the turning, a mating region of the protrusions 40 and the indentation 72 serves as a center of rotation of the turning. During the turning, the projecting portion 56A of the casing end 54 does not abut against the stopper 106 (see the imaginary line VL in FIG. 5). When the casing end 54 is superposed with the casing 24 as described above, the insertion of the cable end 84 attached to the end portion of the second inner cord 22 into the elongated hole 100 of the slider 90 is guided by the insertion guide portion 68 provided at the casing end 54. That is, the insertion guide portion 68 is a structure that retains the cable end 84 at a position in the front-and-rear direction that enables the insertion of the cable end 84 into the elongated hole 100.

Subsequently, the stopper 106 is pushed in to the release position (see FIG. 7). In this state, the restriction of sliding of the slider 90 by the stopper 106 is released, and the connected first and second inner cords 22 are slidable with the slider 90 therebetween. Because the engaging bump portions 52 are engaged in the engaging apertures 88 in this state, the assembled state of the cover 86 to the casing 24 is maintained. In addition, the projecting portion 56A of the casing end 54 and projecting portion 86A of the cover 86 are sandwiched and retained between the connecting portion 110 of the stopper 106 and the casing 24.

If the stopper 106 is disposed at the restriction position during the assembly of the casing end 54 to the casing 24, as shown in FIG. 8, the projecting portion 56A of the casing end 54 abuts against the connecting portion 110 of the stopper 106, which is a state of assembly failure of the casing end 54 to the casing 24. Therefore, a worker may be made aware of the anomaly. During the work of assembly of the casing end 54 to the casing 24 in the present exemplary embodiment, when an assembly failure occurs in which the casing end 54 is disposed at a position of incomplete assembly to the casing 24 (a position before the engaging bump portions 50 engage in the engaging apertures 74), this assembly failure can be resolved by the stopper 106 being displaced from the restriction position to the release position after the assembly work. More specifically, the connecting portion 110 of the stopper 106 that is displaced from the restriction position to the release position mates with the projecting portion 56A of the casing end 54 in the assembly failure state and displaces the casing end 54 relative to the casing 24 to the completed assembly position thereof (the position shown in FIG. 6 and FIG. 7).

—Operation and Effects—

Now, operation and effects of the present exemplary embodiment are described.

In the connection structure 10 with the structure described above, of the first control cable 12 in which the first inner cord 16 is inserted in the first conduit 14, an end portion of the first conduit 14 is anchored at the length direction one end portion of a first coupling case, and an end portion of the first inner cord 16 is anchored at the slider 90. Of the second control cable 18 in which the second inner cord 22 is inserted in the second conduit 20, an end portion of the second conduit 20 is anchored at the casing end 54, and the cable end 84 is attached to an end portion of the second inner cord 22. The casing end 54 is superposed with and assembled to the casing 24 in the radial direction of the second conduit 20. Thus, the first conduit 14 and the second conduit 20 are connected via the casing 24 and the casing end 54 and are disposed in a coaxial condition. The slider 90 is supported at the casing 24 to be slidable in the length direction of the casing 24, and the slider 90 includes the insertion slot 104. During the assembly, the end portion of the second inner cord 22 is inserted into the insertion slot 104 in the radial direction of the second inner cord 22. In the state in which the casing end 54 has been assembled to the casing 24, the cable end 84 is mated with the edge portions of the insertion slot 104 at the opposite side of the insertion slot 104 from the side thereof at which the second conduit 20 is disposed. Thus, The second inner cord 22 is connected with the slider 90. Therefore, the first inner cord 16 and the second inner cord 22 are connected via the slider 90 and the cable end 84.

The cable end 84 is a simple nipple end. The slider 90 is acceptable provided the first inner cord 16 can be anchored at the slider 90 and the cable end 84 can be mated with the slider 90 from the opposite side thereof from the side at which the second conduit 20 is disposed. Therefore, the slider 90 and the cable end 84 (that is, components for connecting the inner cords 16 and 22 with one another) may be formed with simple structures. Further, because the cable end 84 is mated with the slider 90 from the opposite side thereof from the side at which the second conduit 20 is disposed and the cable end 84 connects the second inner cord 22 with the slider 90, there is no requirement to apply force when connecting the second inner cord 22 to the slider 90. Therefore, when the conduits 14 and 20 and the inner cords 16 and 22 are being connected, applying a force for assembling the casing end 54 to the casing 24 is sufficient. Thus, the burden of connection work may be moderated. Further yet, in a control cable relay connection device as described in the BACKGROUND ART section, a first coupling case and a second coupling case may not be tightly fitted together if axes thereof do not perfectly match. In the present exemplary embodiment, however, the casing end 54 is superposed with and assembled to the casing 24 in the radial direction of the second conduit 20. Therefore, assembly is easier than when axes are to be perfectly matched as mentioned above.

In the present exemplary embodiment, when the casing end 54 is being assembled to the casing 24, the casing 24 is fitted inside the two side walls of the casing end 54. Thus, the engaging portions (for example, bump portions) formed at the two side walls of the casing 24 engage with the engagement portions (for example, apertures) formed at the two side walls of the casing end 54. Therefore, the assembled state of the casing end 54 to the casing 24 may be maintained with a simple structure.

In the present exemplary embodiment, when the casing end 54 is being assembled to the casing 24, the cable end 84 attached to the end portion of the second inner cord 22 is inserted (accommodated) in the elongated hole 100 formed in the slider 90. The elongated hole 100 is long in the sliding direction of the slider 90, being specified with a larger dimension in the sliding direction than the cable end 84. Therefore, when the cable end 84 is being inserted into the elongated hole 100 of the slider 90, even if there is inconsistency of positions in the sliding direction of the cable end 84 and the slider 90, the cable end 84 is inserted into the elongated hole 100 of the slider 90 easily.

In the present exemplary embodiment, the insertion guide portion 68 in which the end portion of the second inner cord 22 is inserted is formed at the casing end 54. When the casing end 54 is being assembled to the casing 24, the insertion of the cable end 84 attached to the end portion of the second inner cord 22 into the elongated hole 100 of the slider 90 is guided by the insertion guide portion 68. Therefore, the cable end 84 is inserted into the elongated hole 100 of the slider 90 even more easily.

In the present exemplary embodiment, the assembly guide portion 76 that is open to the opposite side thereof from the side at which the second conduit 20 is disposed is formed at the casing end 54. When the casing end 54 is being assembled to the casing 24, firstly, the length direction other end portion of the casing 24 is inserted into the assembly guide portion 76. Therefore, misalignment of the casing end 54 relative to the casing 24 is restricted. In this misalignment restricting state (the inserted state), the casing end 54 is turned in the radial direction of the second conduit 20 relative to the casing 24. Thus, the casing end 54 is superposed with and assembled to the casing 24 in the radial direction of the second conduit 20. According to this structure, assembly is easier than in a structure in which the casing end 54 is superposed with and assembled to the casing 24 linearly in the radial direction of the second conduit 20 (a structure in which the casing end 54 is assembled linearly from an upper side toward a lower side).

In the present exemplary embodiment, in the state in which the length direction other end portion of the casing 24 has been inserted into the assembly guide portion 76 formed at the casing end 54, the protrusions 40 formed at the casing 24 mate with the indentation 72 formed in the casing end 54. The region of this mating serves as the center of rotation when the casing end 54 is being turned relative to the casing 24 in the radial direction of the second conduit 20. Therefore, shifting of the center of rotation when the casing end 54 is being turned relative to the casing 24 may be prevented. Thus, assembly is even easier.

In the present exemplary embodiment, when the casing end 54 is being assembled to the casing 24, the stopper 106 is disposed at the restriction position. Therefore, sliding of the slider 90 relative to the casing 24 may be restricted. Thus, even if, for example, the first control cable 12 is bent more than anticipated during the assembly, pulling of the slider 90 toward the rear portion side of the casing 24 (the side of the slider 90 at which the dividing wall 36 is disposed) may be prevented. Thus, the end portion of the second inner cord 22 is inserted into the insertion slot 104 of the slider 90 easily. After the completion of assembly of the casing end 54 to the casing 24, the restriction of sliding is released when the stopper 106 is displaced from the restriction position to the release position. Hence, the first and second inner cords 22 that are connected via the slider 90 are slidable.

In the present exemplary embodiment, even if an assembly failure occurs during the work of assembly of the casing end 54 to the casing 24 and the casing end 54 is disposed at a position of incomplete assembly to the casing 24, the stopper 106 is displaced from the restriction position to the release position after the assembly work. Thus, the connecting portion 110 provided at the stopper 106 mates with the casing end 54 and displaces the casing end 54 relative to the casing 24 to the completed assembly position. In this way, the assembly failure may be resolved.

In the exemplary embodiment described above, the structure is provided with the stopper 106 but this is not limiting. A structure is possible in which the stopper 106 is not provided. In this structure too, the one end portion of the second inner cord 22 may be inserted into the insertion slot 104 of the slider 90 provided the slider 90 is disposed in the front portion of the interior of the casing 24 during the assembly work. Even if the slider 90 is not disposed in the front portion of the interior of the casing 24, a worker may slide the slider 90 to the front portion of the interior of the casing 24 with a finger or the like and carry out the assembly in the state in which the slider 90 is disposed in the front portion of the interior of the casing 24. In this situation, the worker may easily slide the slider 90 with a finger or the like if the casing end 54 is assembled to the casing 24 before the cover 86 is assembled to the casing 24.

In the exemplary embodiment described above, when the casing end 54 is being turned and assembled to the casing 24, the protrusions 40 formed at the casing 24 are mated with the indentation 72 formed in the casing end 54, and the region of this mating is the center of the turning. However, this is not limiting. A structure is possible in which the protrusions 40 and indentation 72 are omitted and the casing end 54 is superposed with and assembled to the casing 24 linearly in the radial direction of the second conduit 20.

In the exemplary embodiment described above, the insertion slot 104 is formed in the slider 90, but this not limiting. A structure in which the insertion slot 104 is omitted is possible. In this structure, a mating portion is provided at the slider 90. In the assembled state of the casing end 54 and the casing 24, the cable end 84 is mated with this mating portion from the opposite side thereof from the side at which the second conduit 20 is disposed.

It will be clear that numerous modes may be embodied within a scope that does not depart from the gist of the present disclosure. It will also be clear that the scope of the present disclosure is not to be limited to the exemplary embodiment described above.

The disclosures of Japanese Patent Application No. 2018-192727 filed Oct. 11, 2018 are incorporated into the present specification by reference in their entirety. All references, patent applications and technical specifications cited in the present specification are incorporated by reference into the present specification to the same extent as if the individual references, patent applications and technical specifications were specifically and individually recited as being incorporated by reference.

The invention claimed is:

1. A control cable connection structure, comprising:
   a first control cable comprising a first inner cord inserted in a first conduit;
   a second control cable comprising a second inner cord inserted in a second conduit;
   an elongated first case, an end portion of the first conduit being anchored at one end portion, in a length direction, of the first case;
   a second case at which an end portion of the second conduit is anchored, the second case being superposed and assembled with the first case in a radial direction of the second conduit, and the first and second conduits being disposed coaxially in an assembled state;
   a cable end attached to an end portion of the second inner cord; and
   a slider at which an end portion of the first inner cord is anchored, the slider being supported at the first case to be slidable relative to the first case in the length direction of the first case,
   wherein, in the assembled state, the cable end is engaged with the slider at an opposite side from a side at which the second conduit is disposed, and the second inner cord is connected with the slider,
   wherein an elongated hole is formed in the slider, the elongated hole being long in a sliding direction of the slider, the cable end is inserted into the elongated hole during assembly, and the elongated hole is configured with a larger dimension in the sliding direction than the cable end,
   wherein an insertion guide portion is formed at the second case, another end portion of the second inner cord being inserted into the insertion guide portion and, during assembly, insertion of the cable end into the elongated hole is guided by the insertion guide portion, and
   wherein the first case is formed with an insertion slot into which the insertion guide portion formed in the second case is inserted, and the slider is formed with an insertion slot into which the insertion guide portion is inserted.

2. The control cable connection structure according to claim 1, wherein the second case includes two side walls and, during assembly, the first case is fitted in at inner sides of the two side walls such that engaging portions formed at respective side faces of the first case engage with engagement portions formed at the two side walls of the second case.

3. The control cable connection structure according to claim 1, wherein an assembly guide portion is formed at the second case, the assembly guide portion being open to an opposite side of the second case from a side at which the second conduit is disposed and,
   during assembly, another end portion, in a length direction, of the first case is inserted into the assembly guide portion and, in an inserted state, the second case is turned in the radial direction relative to the first case.

4. The control cable connection structure according to claim 3, wherein a protrusion is formed at one of the first case or the second case, an indentation is formed at the other of the first case or the second case and, in the inserted state, the protrusion engages with the indentation and a region of engagement configures a center of the turning.

5. The control cable connection structure according to claim 1, further comprising a stopper attached to the first case, the stopper being displaceable between a restriction position and a release position, the stopper at the restriction position restricting sliding of the slider, and the stopper at the release position releasing the restriction.

6. A control cable connection structure, comprising:
   a first control cable comprising a first inner cord inserted in a first conduit;
   a second control cable comprising a second inner cord inserted in a second conduit;

an elongated first case, an end portion of the first conduit being anchored at one end portion, in a length direction, of the first case;

a second case at which an end portion of the second conduit is anchored, the second case being superposed and assembled with the first case in a radial direction of the second conduit, and the first and second conduits being disposed coaxially in an assembled state;

a cable end attached to an end portion of the second inner cord;

a slider at which an end portion of the first inner cord is anchored, the slider being supported at the first case to be slidable relative to the first case in the length direction of the first case; and a stopper attached to the first case, the stopper being displaceable between a restriction position and a release position, the stopper at the restriction position restricting sliding of the slider, and the stopper at the release position releasing the restriction, wherein, in the assembled state, the cable end is engaged with the slider at an opposite side from a side at which the second conduit is disposed, and the second inner cord is connected with the slider, and wherein a mating portion is provided at the stopper, and, if the second case is disposed at an incomplete assembly position relative to the first case when the stopper is displaced from the restriction position toward the release position, the mating portion is configured to mate with the second case and displace the second case relative to the first case to a completed assembly position.

* * * * *